(12) United States Patent
Thiele et al.

(10) Patent No.: US 6,929,426 B2
(45) Date of Patent: Aug. 16, 2005

(54) INDEXABLE CUTTING TOOL

(75) Inventors: Rene Thiele, Fuerth (DE); Harvey L. Patterson, Duarte, CA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/369,164

(22) Filed: Feb. 19, 2003

(65) Prior Publication Data

US 2004/0161309 A1 Aug. 19, 2004

(51) Int. Cl.⁷ .............................................. B23C 5/22
(52) U.S. Cl. ........................................ 407/33; 407/96
(58) Field of Search .............................. 407/33, 82, 89, 407/96, 110

(56) References Cited

U.S. PATENT DOCUMENTS

| | | |
|---|---|---|
| ,628,756 A | 1/1899 | Cathcart |
| ,828,758 A | 8/1906 | Meinecke |
| ,854,669 A | 5/1907 | Reidy |
| 2,278,651 A | 1/1942 | Eberhardt ........................ 279/5 |
| 2,277,354 A | 3/1942 | Redinger ......................... 82/37 |
| 2,900,705 A | 5/1959 | Walker ............................ 29/96 |
| 3,557,419 A | 1/1971 | Flannery ....................... 29/105 |
| 3,586,344 A | 6/1971 | Nixon ........................... 279/83 |
| 3,664,677 A | 5/1972 | Sunderman et al. ........... 279/83 |
| 4,632,593 A | 12/1986 | Stashko ....................... 403/316 |
| 5,288,182 A | 2/1994 | Patterson et al. ........... 408/146 |
| 5,411,354 A * | 5/1995 | Gustafsson .................. 407/110 |
| 5,934,843 A * | 8/1999 | Brask et al. ................. 407/106 |
| 6,244,780 B1 * | 6/2001 | Hansson ................... 403/374.3 |

* cited by examiner

*Primary Examiner*—Willmon Fridie, Jr.
(74) *Attorney, Agent, or Firm*—Larry B. Meenan

(57) ABSTRACT

A cutting tool is in the form of a holder and a cutting insert that is quickly and easily indexable in one of a plurality of precision cutting positions within the holder. The holder has a bore therein and a stop in the bore. The cutting insert has a shank portion that is insertable into the bore. The cutting insert, when inserted into bore, mates with the stop to locate the cutting insert in one of a plurality of positions. Alternatively, the stop can be supported by the cutting insert and mate with the holder.

6 Claims, 4 Drawing Sheets

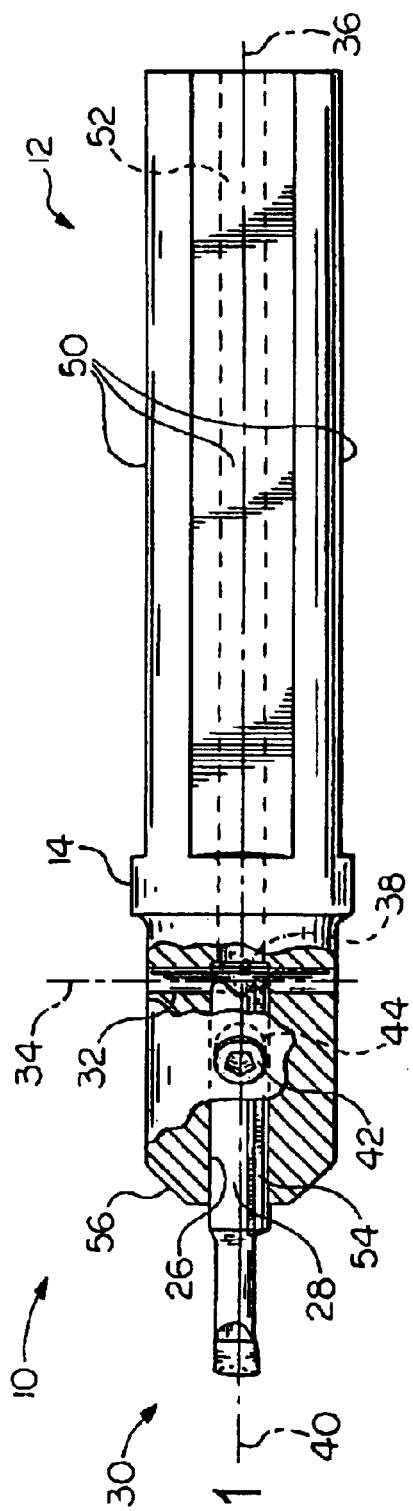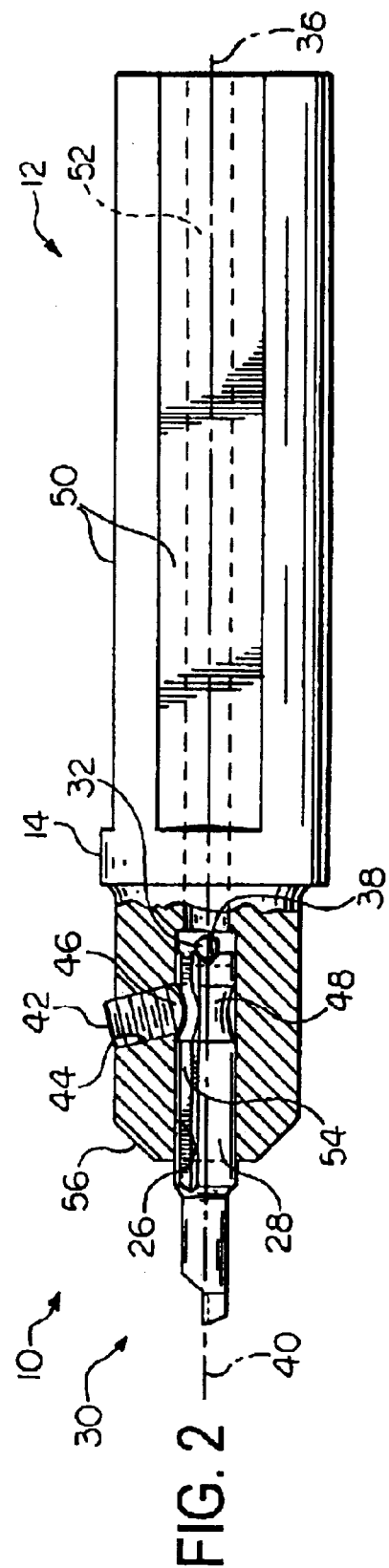

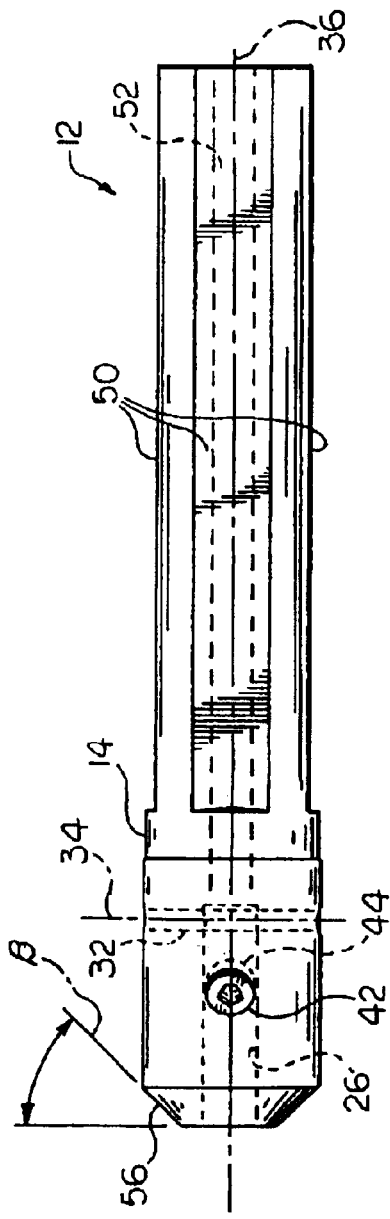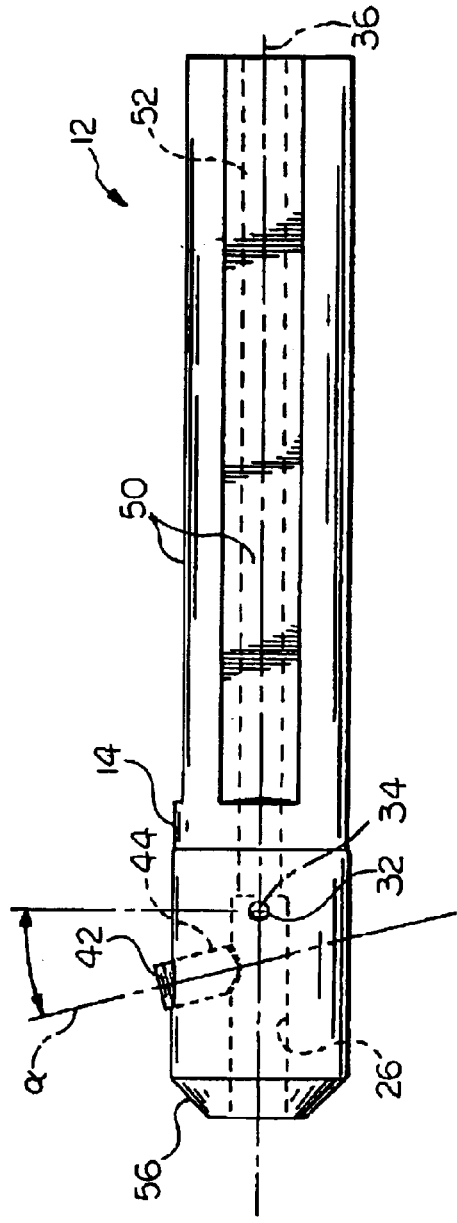

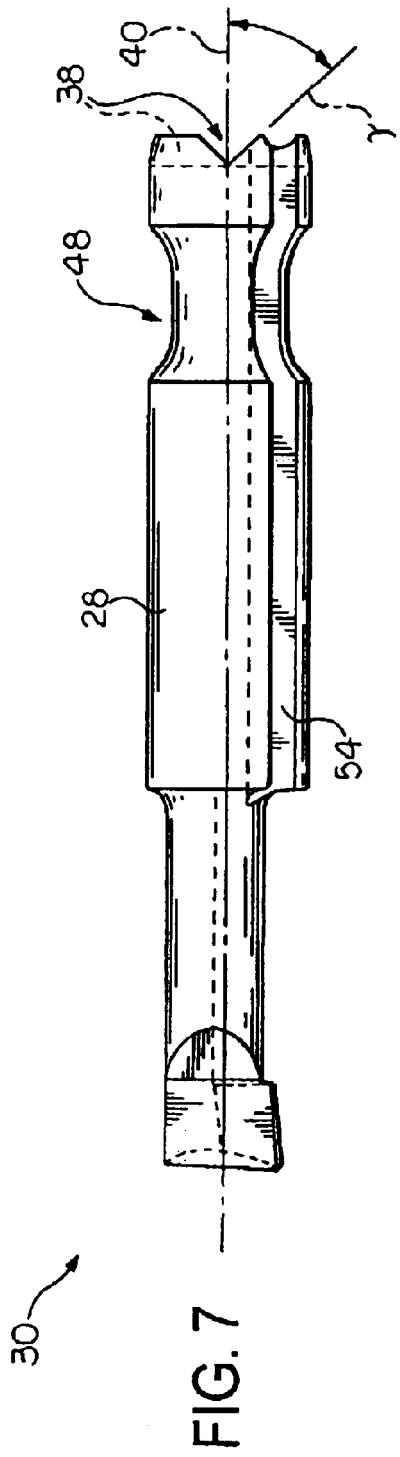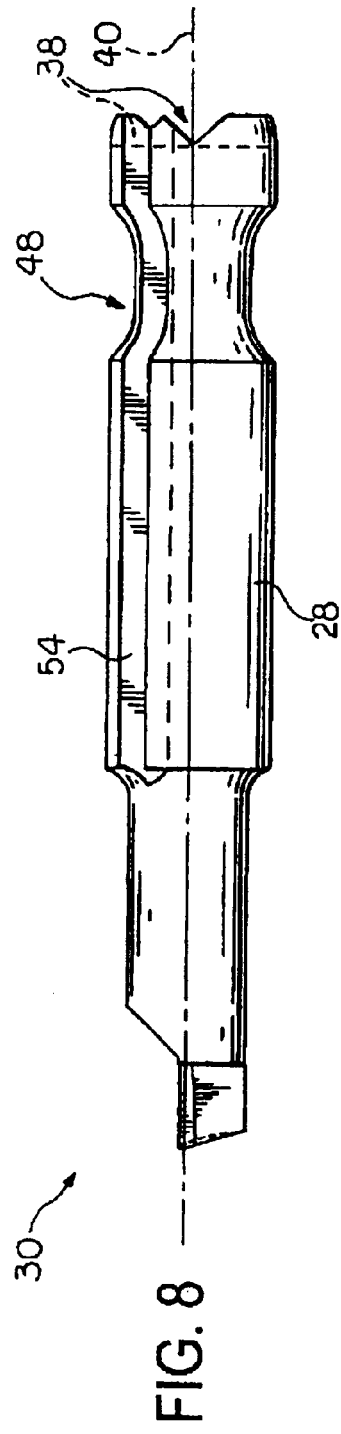

INDEXABLE CUTTING TOOL

BACKGROUND OF THE INVENTION

1. Field of the Invention

The present invention relates to machine tools and, more particularly, to a holder for supporting a removable cutting insert. Most particularly, the present invention relates to a holder having an improved clamping mechanism, wherein a cutting insert is quickly and easily indexable in one of a plurality of precision cutting positions.

2. Description of the Related Art

A conventional machine tool typically includes a spindle within which there is a combined holder and cutting insert. When the insert becomes dull, it is removed and replaced with a new cutting insert. Indexing the cutting insert makes it possible to reinsert the cutting insert in the same position.

One type of indexing, which achieves a position close to that of a previously used cutting insert, provides a flattened surface on one side of the cutting insert and a setscrew through the holder to bias against the flat surface. However, this structure does not accurately position the cutting insert because the setscrew only engages a small area of the flat surface. Moreover, there is no assurance that the cutting insert will properly engage the holder to assure stability of the cutting insert during a cutting operation.

Another type of indexing provides a groove in the cutting insert that cooperates with a pin passing through the holder. A setscrew bears against the surface of a depression formed in the cutting insert to force the groove into contact with the pin. In accordance with this design, the groove and pin cooperatively locate the cutting insert in a desired position. However, this design locates the cutting insert in a single position.

It is desirable in the machine tool art to be able to establish a machine setup for progressive machining operations. For example, this may involve having a first cutting insert make a desired cut. The first cutting insert is withdrawn from the holder and a second cutting insert is inserted into the holder to make another cut. Then, the second cutting insert is withdrawn from the holder and the first cutting insert is repositioned into the same position that it formerly occupied in the holder to duplicate the first cut. This machining operation is referred to as "repetitive positioning". Repetitive positioning necessarily requires that the cutting insert be precisely locatable relative to the holder.

Additionally, it is desirable that a cutting insert be readily insertable into and removable from the holder so that various machine operations can take place with the maximum amount of efficiency. In other words, not only must the holder and cutting insert cooperatively provide for the repetitive positioning of the cutting insert, it is desirable that this be done very quickly.

SUMMARY OF THE INVENTION

Generally speaking, the invention is directed to a cutting tool that has a cutting insert that is quickly and easily indexable in one of a plurality of precision cutting positions within a holder. The holder has a bore therein and a stop in the bore. The cutting insert has a shank portion that is insertable into the bore. The shank portion, when inserted into bore, mates with the stop to locate the insert in one of a plurality of positions. Alternatively, the stop can be supported by the shank portion and mate with the holder.

BRIEF DESCRIPTION OF THE DRAWINGS

Further features of the present invention, as well as the advantages derived therefrom, will become clear from the following detailed description made with reference to the drawings in which:

FIG. 1 is a partially cutaway, side elevational view of a cutting tool according to a preferred embodiment of the invention;

FIG. 2 is a partially cutaway, top plan view of the tool illustrated in FIG. 1;

FIG. 4 is a reduced-scale top plan view of the holder illustrated in FIG. 3;

FIG. 5 is a side elevational view of the holder illustrated in FIG. 4;

FIG. 7 is a reduced-scale top plan view of the cutting insert illustrated in FIG. 6; and FIG. 8 is a side elevational view of the cutting insert illustrated in FIG. 7.

DESCRIPTION OF THE PREFERRED EMBODIMENT

With reference now to the drawings, wherein like numerals designate like components throughout all of the several figures, there is illustrated in FIGS. 1 and 2 a cutting tool 10 according to a preferred embodiment of the invention. The cutting tool 10 is adapted to be carried by any suitable cutting machine. The cutting tool 10 comprises a holder 12 having a generally cylindrical axially extending outer surface 14 that is adapted to mate with a machine spindle (not shown).

Figure 3:
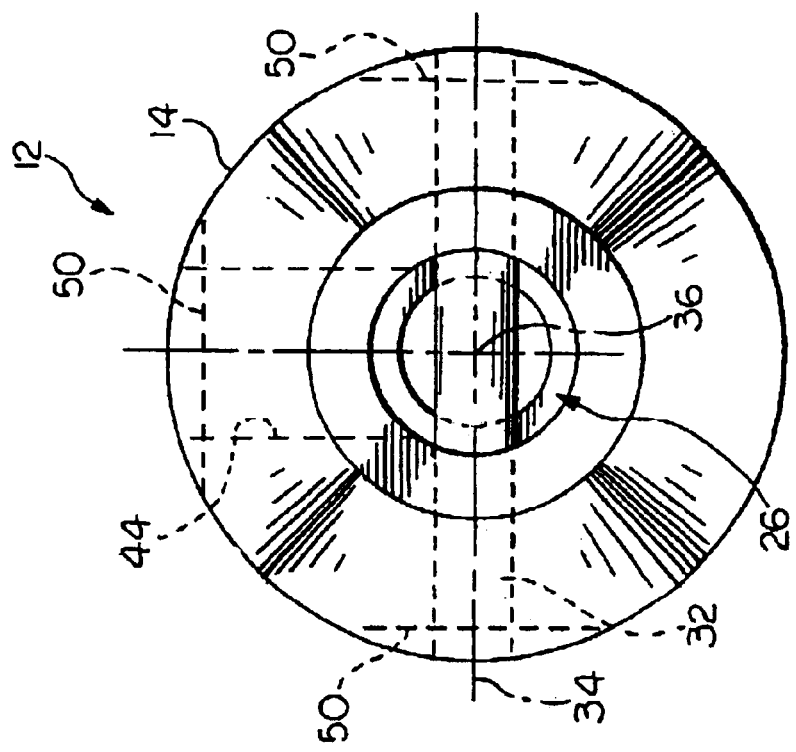
FIG. 3 is an enlarged front elevational view of the holder of the tool illustrated in FIGS. 1 and 2.

The holder 12 has a longitudinally extending bore 26 therein that is adapted to receive the shank portion 28 of a cutting insert 30. The cutting insert 30 can be in the form of any suitable cutting element, including but not limited to a boring bar, drill, or milling cutter. To aid in repetitive positioning, a stop 32 is fixed with respect to the holder 12. The stop 32 may be in the form of a pin that extends radially or transversely through the bore 26 in the holder 12 and has a central axis 34 that extends through the longitudinal axis 36 of the holder 12, as best seen in FIG. 3. As clearly shown in FIG. 1, the pin extends laterally through the bore 26 so that the pin is exposed within the bore 26. The stop 32 is not intended to be limited to the pin illustrated in the drawings but can be in the form of any suitable stop element, such as a protrusion extending from a slug (not shown) or otherwise supported in the bore 26.

Figure 6:
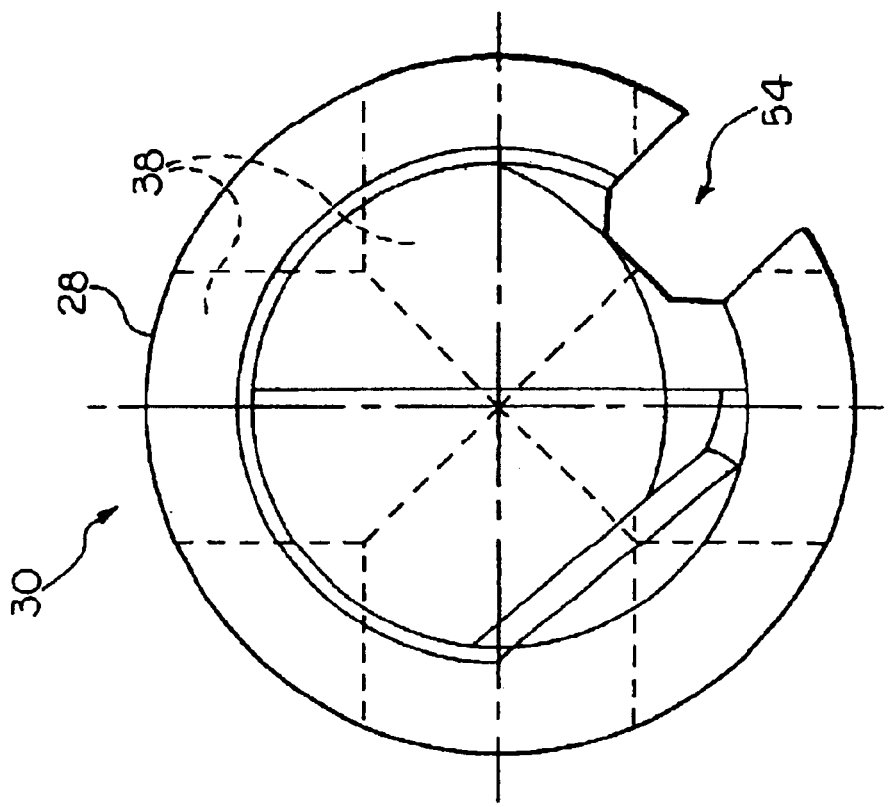
FIG. 6 is an enlarged front elevational view of the cutting insert of the tool illustrated in FIGS. 1 and 2.

The shank portion 28 of the cutting insert 30, as seen in FIGS. 1 and 2, is insertable into the bore 26 and has a plurality of locating grooves 38 at one extremity thereof that intersect the longitudinal axis 40 of the cutting insert 30. The cutting insert 30 shown preferably has two grooves 38 intersecting at a right angle, as clearly illustrated in FIGS. 6 through 8. At least a portion of each groove 38 is preferably V-shaped to form a depression in the rear face of the cutting insert 30, wherein the depression is formed by opposing surfaces each having an angle γ of about 45 degrees from the axis 40 of the cutting insert 30. As shown in FIGS. 1 and 2, the grooves 38 are designed to receive the stop 32, with the deepest portion of the grooves 38 intersecting the longitudinal axis 36 of the bore 26. In this manner, the cutting insert 30, when inserted into the bore 26, will mate with the stop 32 by way of the groove 38 to form a "positive stop" in one of a plurality of positions. For example, in the illustrated embodiment, the shank portion 28 of the cutting insert 30 can be inserted into the bore 26 in four different positions, namely, 0, 90, 180, and 270-degree positions. Any amount of turning of the shank portion 28 relative to the stop 32 of insufficient proportion to mate the shank portion 28 with the groove 38 will be apparent to a machine operator. It is, therefore, clear that the cutting insert 30 can be inserted properly in the bore 26 in one of a plurality of different positions and, thus, is "indexable". To this end, the grooves 38 function as radial locators for the cutting insert 30. It should be appreciated that locators, other than the grooves 38 shown, may be suitable for carrying out the invention. For example, the shank portion 28 may have one or more depressions that mate with one or more protrusions in the bore 26 to locate the cutting insert 30 in one of a plurality of positions. Conversely, the shank portion 28 may have one or more protrusions that mate with one or more depressions in the bore 26 to locate the cutting insert 30 in one of a plurality of positions.

To hold the cutting insert 30 in place, threaded member 42 is disposed in a threaded aperture 44 angularly with respect to the longitudinal axis 36 of the bore 26. The threaded member 42 preferably has a ball nose end 46 that is adapted to be received in an annular relief 48 in the outer surface of the shank portion 28. The threaded member 42 is also preferably made of a hardened material to endure wear. The angle $\alpha$ of the aperture 44 is preferably in a range of about 12 to 20 degrees relative to the central axis 34 of the stop 32 and most preferably about 15 degrees, as illustrated in FIG. 5. As the threaded member 42 is threaded inwardly in the direction of the relief 48, a pressure is exerted against the shank portion 28 of the cutting insert 30, driving it firmly into engagement with the stop 32 and locking it in place, as depicted in FIG. 2. Therefore, when one of the grooves 38 of the shank portion 28 is properly positioned against the stop 32, the threaded member 42 is threaded inwardly engaging the relief 48 so that the cutting insert 30 is then immovable with respect to the holder 12. In this manner, the cooperation of the groove 38 and the stop 32 provides a radial locator.

The holder 12 preferably has one or more flats 50 in its outer surface 14. Preferably, three flats 50 are circumferentially spaced 90 degrees apart. The flats 50 are provided to enable the holder 12 to be used on certain machines that require flats. However, the generally cylindrical outer surface 14 enables the holder 12 to be used on machines that do not require flats. In this way, the holder 12 can be used on different machines.

The holder 12 also preferably has a through-bore 52 therethrough. The through-bore 52 is in fluid communication with a keyway or slot 54 extending axially along the outer surface of the cutting insert 30. The through-bore 52 and slot 54 permit coolant to pass internally from the spindle (not shown) through the cutting tool 10 to a workpiece (not shown), which preserves the life of the cutting tool 10. The holder 12 may further be provided with a tapered or chambered front tip 56, which permits unencumbered flow of coolant to the workpiece, externally of the spindle and the cutting tool 10. This also permits an unencumbered evacuation of chips from the workpiece. In a preferred embodiment of the invention, the tip 56 is tapered at an angle $\beta$ in a range of about 30 to 60 degrees and most preferably at an angle $\beta$ of about 45 degrees, as shown in FIG. 4.

The shank portion 28 can support any form of cutting element in accordance with the present invention and can have any size cutting surface carried thereon. The cutting element can be repetitively positioned relative to the holder 12 due to the presence of the stop 32 and grooves 38. In a preferred embodiment of the invention, the cutting insert 30 is made of carbide steel. In this way, the extremity of the shank portion 28 and the grooves 38 therein endure wear and thus have a longer useful life.

It should be appreciated that the cutting insert 30 can take any form, such as a boring, drilling or milling cutter, and can be interchangeably received in the bore 26 so that previously established radial locations of the cutting insert 30 are duplicated in successive machining operations. In repetitive positioning operations, the rotating axis of the cutting insert 30 must be duplicated in successive machining operations in order to assure that the precise size of a successively machined aperture duplicates the size of an aperture previously machined. The present invention provides a quick-change cutting tool that will duplicate the previously established axis of an aperture made by the cutting insert 30 when it has a given rotational axis, and the size of the aperture is thereby duplicated. The only tolerances, then, that must be maintained are the tolerances of the grooves 38 on the rear surface of the shank portion 28 of the cutting insert 30. This represents a minimum amount of machining and layout work, which necessarily reduces the cost of providing an interchangeable setup, such as herein disclosed. No involved mechanism is necessary and no extensive machining is needed because the only dimension of criticality is the rear extremity of the shank portion 28 and the groove 38 therein. In this manner, a quick-change cutting tool 10 is provided that is relatively simple to manufacture.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. In combination:
   a holder having a longitudinally extending bore therein and a stop supported therein;
   a cutting insert having a longitudinal axis and a shank portion, the shank portion being insertable into the bore and having a plurality of locating grooves at one extremity thereof that intersect the longitudinal axis of the cutting insert, wherein the cutting insert, when inserted into the bore, mates with the stop by way of one of the grooves to form a positive stop in one of a plurality of positions;
   a threaded member disposed in a threaded aperture in the holder angularly with respect to the longitudinal axis of the bore; and
   an annular relief in an outer surface of the shank portion of the holder, the threaded member being adapted to be threaded toward the relief to exert a pressure against the shank portion of the cutting insert to drive the shank portion firmly into engagement with the stop and lock the shank portion in place.

2. The combination of claim 1, wherein the threaded member has a ball nose end.

3. The combination of claim 1, wherein the aperture is at an angle in a range of about 12 to 20 degrees relative to a central axis of the stop.

4. The combination of claim 1, wherein the aperture is at an angle of about 15 degrees relative to a central axis of the stop.

5. In combination:
   a holder having a longitudinally extending bore therein and a stop supported therein; and a cutting insert having a longitudinal axis and a shank portion, the shank portion insertable into the bore and having a plurality of locating grooves at one extremity thereof that intersect the longitudinal axis of the cutting insert, wherein the cutting insert, when inserted into the bore, mates with the stop by way of one of the grooves to form a positive stop in one of a plurality of positions;

wherein the holder has a front tip that is tapered at an angle in a range of about 30–60 degrees.

6. In combination:

a holder having a longitudinally extending bore therein and a stop supported therein; and a cutting insert having a longitudinal axis end a shank portion, the shank portion being insertable into the bore and having a plurality of locating grooves at one extremity thereof that intersect the longitudinal axis of the cutting insert, wherein the cutting insert, when inserted into the bore, mates with the stop by way of one of the grooves to form a positive stop in one of a plurality of positions;

wherein the holder has a front tip that is tapered at an angle of about 45 degrees.

* * * * *